(12) United States Patent
Bulgrin et al.

(10) Patent No.: US 12,036,627 B2
(45) Date of Patent: Jul. 16, 2024

(54) TECHNIQUES AND ASSEMBLIES FOR JOINING COMPONENTS

(71) Applicant: Rolls-Royce Corporation, Indianapolis, IN (US)

(72) Inventors: Charles Alan Bulgrin, Indianapolis, IN (US); Carl R. Russo, Indianapolis, IN (US); Joseph Peter Henderkott, Indianapolis, IN (US); Matthew T. Kush, Indianapolis, IN (US); Greg Lopshire, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 67 days.

(21) Appl. No.: 17/664,528

(22) Filed: May 23, 2022

(65) Prior Publication Data
US 2023/0033578 A1    Feb. 2, 2023

Related U.S. Application Data

(63) Continuation of application No. 16/294,415, filed on Mar. 6, 2019, now Pat. No. 11,338,396.
(Continued)

(51) Int. Cl.
*B23K 35/22*    (2006.01)
*B23K 1/00*    (2006.01)
(Continued)

(52) U.S. Cl.
CPC .......... *B23K 35/224* (2013.01); *B23K 1/0018* (2013.01); *B23K 1/008* (2013.01);
(Continued)

(58) Field of Classification Search
None
See application file for complete search history.

(56) References Cited

U.S. PATENT DOCUMENTS

| | | | |
|---|---|---|---|
| 3,024,109 | A | 3/1962 | Hoppin, III et al. |
| 3,517,428 | A | 6/1970 | Gadd |

(Continued)

FOREIGN PATENT DOCUMENTS

| | | |
|---|---|---|
| CN | 105091030 A | 11/2015 |
| DE | 10319494 A1 | 11/2004 |

(Continued)

OTHER PUBLICATIONS

Communication pursuant to Article 94(3) EPC from counterpart European Application No. 19160647.4, dated Mar. 2, 2022, 6 pp.
(Continued)

*Primary Examiner* — Seth Dumbris
(74) *Attorney, Agent, or Firm* — Shumaker & Sieffert, P.A.

(57) ABSTRACT

The disclosure describes example techniques and assemblies for joining a first component and a second component. The techniques may include positioning the first and second component adjacent to each other to define a joint region between adjacent portions of the first component and the second component, the joint region being coated with an adhesion resistant coating. The techniques may also include positioning a braze material in the joint region, heating the braze material to form an at least softened material, and cooling the at least softened material to form a mechanical interlock including the braze material in the joint region joining the first and second components. The braze material does not metallurgically bond to the joint surface.

17 Claims, 8 Drawing Sheets

Related U.S. Application Data

(60) Provisional application No. 62/640,349, filed on Mar. 8, 2018.

(51) Int. Cl.
    *B23K 1/008*  (2006.01)
    *B23K 1/19*   (2006.01)
    *B23K 1/20*   (2006.01)
    *B23K 20/18*  (2006.01)
    *B23K 101/00* (2006.01)
    *B23K 103/08* (2006.01)
    *F01D 5/00*   (2006.01)

(52) U.S. Cl.
    CPC ............... *B23K 1/19* (2013.01); *B23K 1/20* (2013.01); *B23K 20/18* (2013.01); *B23K 2101/001* (2018.08); *B23K 2103/08* (2018.08); *F01D 5/00* (2013.01)

(56) References Cited

U.S. PATENT DOCUMENTS

| | | | |
|---|---|---|---|
| 3,706,203 A | 12/1972 | Goldberg et al. | |
| 3,806,276 A | 4/1974 | Aspinwall | |
| 3,906,617 A | 9/1975 | Behringer et al. | |
| 4,695,247 A | 9/1987 | Enzaki et al. | |
| 4,980,241 A * | 12/1990 | Hoffmueller | ........... F01D 5/066 277/654 |
| 5,100,050 A | 3/1992 | Krueger et al. | |
| 5,332,360 A | 7/1994 | Correia et al. | |
| 5,640,767 A | 6/1997 | Jackson et al. | |
| 5,797,725 A | 8/1998 | Rhodes | |
| 5,976,337 A | 11/1999 | Korinko et al. | |
| 6,003,754 A | 12/1999 | Rhodes | |
| 6,172,327 B1 | 1/2001 | Aleshin et al. | |
| 6,199,746 B1 | 3/2001 | Dupree et al. | |
| 6,213,714 B1 | 4/2001 | Rhodes | |
| 6,214,248 B1 | 4/2001 | Browning et al. | |
| 6,575,702 B2 | 6/2003 | Jackson et al. | |
| 6,602,053 B2 | 8/2003 | Subramanian et al. | |
| 6,837,417 B2 | 1/2005 | Srinivasan | |
| 7,051,435 B1 | 5/2006 | Subramanian et al. | |
| 7,080,971 B2 | 7/2006 | Wilson et al. | |
| 7,146,725 B2 | 12/2006 | Kottilingam et al. | |
| 7,484,928 B2 | 2/2009 | Arness et al. | |
| 7,731,809 B2 | 6/2010 | Hu | |
| 7,761,989 B2 | 7/2010 | Lutz et al. | |
| 7,810,237 B2 | 10/2010 | Lange et al. | |
| 7,966,707 B2 | 6/2011 | Szela et al. | |
| 8,052,391 B1 | 11/2011 | Brown | |
| 8,070,450 B1 | 12/2011 | Ryznic et al. | |
| 8,087,565 B2 | 1/2012 | Kottilingam et al. | |
| 8,247,733 B2 | 8/2012 | Zhu | |
| 8,356,409 B2 | 1/2013 | Perret | |
| 8,528,208 B2 | 9/2013 | Rebak et al. | |
| 8,539,659 B2 | 9/2013 | Szela et al. | |
| 8,555,500 B2 | 10/2013 | Vossberg et al. | |
| 8,739,404 B2 | 6/2014 | Bunker et al. | |
| 8,800,298 B2 | 8/2014 | Ladd et al. | |
| 8,875,392 B2 | 11/2014 | Richter | |
| 9,003,657 B2 | 4/2015 | Bunker et al. | |
| 9,085,980 B2 | 7/2015 | Mittendorf et al. | |
| 9,174,312 B2 | 11/2015 | Baughman et al. | |
| 9,228,958 B2 | 1/2016 | Shirkhodaie et al. | |
| 9,254,537 B2 | 2/2016 | Li et al. | |
| 9,476,306 B2 | 10/2016 | Bunker | |
| 9,751,147 B2 | 9/2017 | Rhodes et al. | |
| 9,810,069 B2 | 11/2017 | Dubs et al. | |
| 9,863,249 B2 | 1/2018 | Shinn et al. | |
| 10,450,871 B2 | 10/2019 | Henderkott et al. | |
| 10,689,984 B2 | 6/2020 | Varney | |
| 10,766,105 B2 | 9/2020 | Henderkott et al. | |
| 11,338,396 B2 | 5/2022 | Bulgrin et al. | |
| 2003/0026697 A1 | 2/2003 | Subramanian et al. | |
| 2004/0086635 A1 | 5/2004 | Grossklaus et al. | |
| 2005/0217110 A1 | 10/2005 | Topal | |
| 2006/0120869 A1 | 6/2006 | Wilson et al. | |
| 2007/0044306 A1 | 3/2007 | Szela et al. | |
| 2007/0163684 A1 | 7/2007 | Hu | |
| 2008/0011813 A1 | 1/2008 | Bucci et al. | |
| 2009/0026182 A1 | 1/2009 | Hu et al. | |
| 2009/0194247 A1 | 8/2009 | Kriegl | |
| 2009/0196761 A1 | 8/2009 | James | |
| 2009/0255116 A1 | 10/2009 | McMasters et al. | |
| 2009/0324841 A1 | 12/2009 | Arrell et al. | |
| 2010/0124492 A1 * | 5/2010 | Tucker | ........... B23K 1/0018 29/889.22 |
| 2010/0176097 A1 | 7/2010 | Zhu | |
| 2010/0257733 A1 | 10/2010 | Guo et al. | |
| 2011/0051179 A1 | 3/2011 | Iga | |
| 2011/0185739 A1 | 8/2011 | Bronson et al. | |
| 2012/0179285 A1 | 7/2012 | Melzer-Jokisch et al. | |
| 2012/0222306 A1 | 9/2012 | Mittendorf et al. | |
| 2013/0195674 A1 | 8/2013 | Watson et al. | |
| 2014/0003948 A1 | 1/2014 | Dubs et al. | |
| 2014/0044939 A1 | 2/2014 | Hunt et al. | |
| 2014/0169943 A1 | 6/2014 | Bunker et al. | |
| 2014/0259666 A1 | 9/2014 | Baughman et al. | |
| 2014/0271153 A1 | 9/2014 | Uskert et al. | |
| 2014/0302278 A1 | 10/2014 | Bunker | |
| 2015/0016972 A1 | 1/2015 | Freeman et al. | |
| 2015/0047168 A1 | 2/2015 | James et al. | |
| 2015/0367456 A1 | 12/2015 | Ozbaysal et al. | |
| 2015/0375322 A1 | 12/2015 | Salm et al. | |
| 2015/0377037 A1 | 12/2015 | Salm et al. | |
| 2016/0032766 A1 | 2/2016 | Bunker et al. | |
| 2016/0177749 A1 | 6/2016 | Brandl et al. | |
| 2016/0230576 A1 | 8/2016 | Freeman et al. | |
| 2016/0250725 A1 | 9/2016 | Henderkott et al. | |
| 2016/0339544 A1 | 11/2016 | Xu et al. | |
| 2016/0375461 A1 | 12/2016 | Taylor | |
| 2017/0252870 A1 | 9/2017 | Cui et al. | |
| 2018/0073390 A1 | 3/2018 | Varney | |
| 2018/0073396 A1 | 3/2018 | Varney | |
| 2018/0093354 A1 | 4/2018 | Cui et al. | |
| 2019/0275617 A1 | 9/2019 | Bulgrin et al. | |
| 2020/0368857 A1 | 11/2020 | Henderkott et al. | |
| 2023/0033578 A1 | 2/2023 | Bulgrin et al. | |

FOREIGN PATENT DOCUMENTS

| | | | |
|---|---|---|---|
| DE | 102006005364 A1 | 8/2007 | |
| DE | 102008007820 A1 | 8/2009 | |
| DE | 102008058140 A1 | 5/2010 | |
| EP | 1503144 A1 | 2/2005 | |
| EP | 1528322 A2 | 5/2005 | |
| EP | 1584702 A1 | 5/2005 | |
| EP | 1803521 A1 | 7/2007 | |
| EP | 1880793 A2 | 1/2008 | |
| EP | 1884306 A1 | 2/2008 | |
| EP | 2206575 A1 | 7/2010 | |
| EP | 2578720 A2 | 4/2013 | |
| EP | 2700788 A1 | 2/2014 | |
| EP | 2700788 A1 * | 2/2014 | ............... F01D 5/20 |
| EP | 2713007 A1 | 4/2014 | |
| EP | 3061556 A1 | 8/2016 | |
| WO | 2012092279 A1 | 7/2012 | |
| WO | 2015147929 A2 | 10/2015 | |

OTHER PUBLICATIONS

Extended Search Report from counterpart European Application No. 19160647.4, dated Aug. 2, 2019, 8 pp.

Prosecution History from U.S. Appl. No. 16/294,415, now U.S. Pat. No. 11,338,396, dated Feb. 23, 2021 through Apr. 14, 2022, 56 pp.

Response to Extended Search Report dated Aug. 2, 2019, from counterpart European Application No. 19160647.4, filed Feb. 27, 2020, 56 pp.

Response to Communication pursuant to Article 94(3) EPC dated Mar. 2, 2022, from counterpart European Application No. 19160647.4 filed Jun. 29, 2022, 24 pp.

(56) References Cited

OTHER PUBLICATIONS

Communication pursuant to Article 94(3) EPC from counterpart European Application No. 19160647.4 dated Jan. 30, 2024, 6 pp.

* cited by examiner

TECHNIQUES AND ASSEMBLIES FOR JOINING COMPONENTS

This application is a continuation of U.S. patent application Ser. No. 16/294,415 filed on Mar. 6, 2019, which claims the benefit of U.S. Provisional Patent Application No. 62/640,349, filed Mar. 8, 2018, the entire contents of which are incorporated herein by reference.

TECHNICAL FIELD

The present disclosure generally relates to techniques and assemblies for joining components.

BACKGROUND

Casting may be used to form metal or alloy components. However, casting relatively large articles or articles having a relatively complex geometry in a single operation may be difficult, or result in deviation of a cast article from specifications or tolerance. When forming articles from superalloys including a single crystal, casting may be difficult, leading to relatively high rejection rates due to defects in the cast article. For example, nozzle guide vanes for gas turbine engines may be cast as a single crystal, and this may restrict design complexity of the nozzle guide vanes. Instead of casting or otherwise forming large or complex articles as a single piece or component, such articles may be cast or otherwise fabricated in the form of separate components, which may be joined to form an assembly.

SUMMARY

The disclosure describes example assemblies and techniques for joining components, for example, metal or alloy components or ceramic-based components.

In some examples, the disclosure describes an example technique including positioning a first component and a second component adjacent to each other to define a joint region between adjacent portions of the first component and the second component. The joint region defines a joint surface. The example technique further includes positioning a braze in the joint region. An adhesion resistant material present between the braze material and the joint surface. The adhesion resistant material is configured to resist adherence of the braze material to the joint surface. The example technique further includes heating the braze material to a processing temperature to form an at least softened material in the joint region. The example technique further includes cooling the at least softened material to form a mechanical interlock including the braze material in the joint region joining the first and second components. The braze material does not metallurgically bond to the joint surface.

In some examples, the disclosure describes an example assembly including a first component and a second component. The first component and second component are positioned adjacent to each other to define a joint region between adjacent portions of the first component and the second component. The joint region defines a joint surface. The example assembly includes a mechanical interlock including braze material disposed in the joint region. The assembly also include an adhesion resistant material between the braze material and the joint surface. The adhesion resistant material is configured to resist adherence of the braze material to the joint surface. The braze material is configured to form an at least softened material in the joint region in response to heating the braze material to a processing temperature. The at least softened material is configured to form the mechanical interlock in the joint region mechanically joining the first and second components in response to cooling. The braze material is not metallurgically bonded to the first component or the second component.

The details of one or more examples are set forth in the accompanying drawings and the description below. Other features, objects, and advantages will be apparent from the description and drawings, and from the claims.

DETAILED DESCRIPTION

Figure 1A:
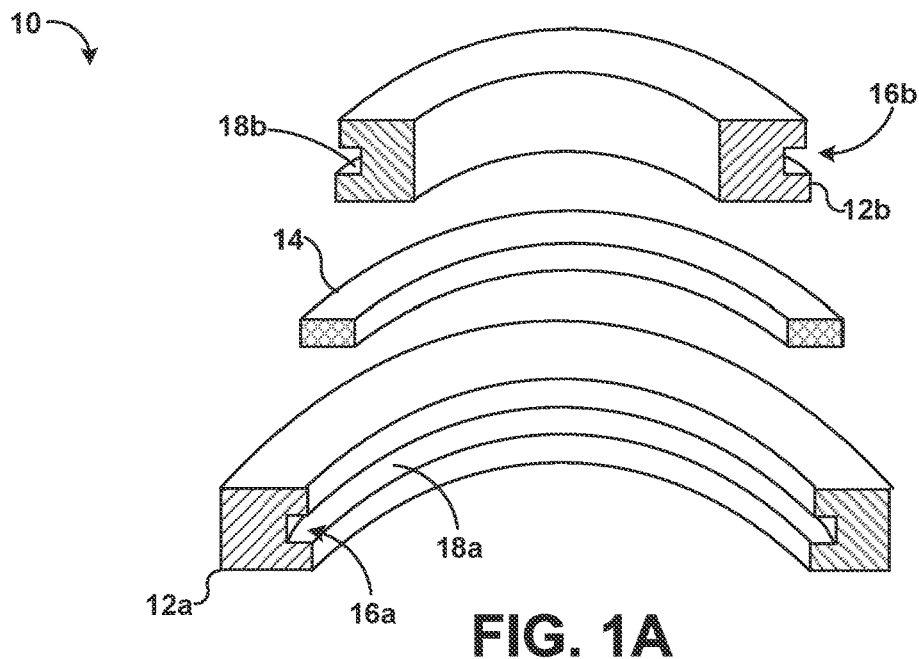
FIG. 1A is a conceptual and schematic diagram illustrating an exploded view of an example assembly for joining a first component and a second component using a braze material to form a mechanical interlock.

The disclosure describes assemblies, systems, articles, and techniques for joining a first component and a second component using a braze material that does not metallurgically bond the first component to the second component. The first component and the second component define a joint region defining a joint surface. An adhesion resistant material is present between the joint surface and the braze material and is configured to resist adherence of the braze material to the joint surface. At least one of the first or the second component may include a metal, an alloy, or a ceramic-based structure, for example, a ceramic matrix composite.

In some example techniques, the braze material is heated to a processing temperature to form an at least softened material, which may flow, occupy, or otherwise at least partially conform to the joint region (e.g., may conform to or nearly conform to at least a portion of the joint region). The at least softened material may cool to form a mechanical interlock in the joint region, restraining the first component relative to the second component. In some examples, the mechanical interlock may at least partially surround one or both of the first component or the second component. The mechanical may mechanically secure the first component relative to the second component. The first or second components may include components or a gas turbine engine, for example, a high-pressure nozzle guide vane and shroud. In some example, the components may include any components benefitting from a close fitting (relatively low leakage) structural connection in high-temperature operating conditions.

While techniques such as bi-casting may be used to produce an integrally formed metallic joint or "clip" to structurally connect components, bi-casting may require a casting foundry, including, for example, separate furnace preheat and furnace (liquid metal) pouring operations with elaborate tooling (while needing close monitoring and control in various stages of the process). In order to integrally form a bi-cast joint or clip, a metal or alloy may need to be fully molten or liquid and superheated to a temperature well above the melting point of components being joined. Moreover, any significant leakage of molten metal or alloy during the bi-casting process may affect the integrity of components being joined or of surrounding furnace tooling, which may be costly and difficult to replace.

In contrast, example techniques and assemblies according to the disclosure may be deployed using treatment temperatures and durations that may substantially maintain the integrity of the components being joined and tooling or support components used for joining the components. Some example techniques and assemblies according to the disclosure may result in a relatively low leakage structural connection between components operating in high temperature environments. In some examples, a plurality of pairs of components may be joined at the same time using a batch process, in contrast with a bi-casting process in which a single pair of first and second components and is processed at a time and processing multiple pairs of components requires multiple processings. In some examples, the braze material may include wide gap braze alloy, a pre-sintered preform (PSP) or another composition having predetermined ratios of braze alloy to superalloy powder as described elsewhere in the disclosure.

Because the braze materials described herein may possess mechanical and chemical properties (e.g., mechanical strength and high temperature oxidation resistance) that make the material suitable for use in high temperature oxidative environments, the braze materials may facilitate manufacture of articles for high temperature mechanical systems in multiple components, which are then joined using the braze materials. This may reduce cost of manufacture due to lower defect levels in the components, facilitate more complex geometry, or the like. In some examples, the braze materials including a PSP also may provide advantages compared to powder braze materials. For example, the PSP materials may result in reduced porosity in joints compared to joints formed using a braze powder, which may improve mechanical properties of the braze joint. Further, the PSP materials may be easier to position in the joint region and result in a more uniform joint.

The adhesion-resistant material is selected to resist the formation of a metallurgical bond between the mechanical interlock formed by the braze material and the joint surfaces. For example, the adhesion resistant material may include a coating that may act as a leave-in-place "stop-off", substantially preventing the formation of a metallurgical bond, while avoiding or substantially preventing introducing a gap (as contrasted with a stop-off removed after application). As another example, the adhesion resistant material may include a superalloy foil or a superalloy powder present between the braze material and the joint surfaces. The superalloy foil or superalloy powder may be selected to have a melting point above the processing temperature to which the braze material is heated, such that the superalloy foil or superalloy powder does not melt during processing of the braze material to form the mechanical interlock. Avoiding the formation of a metallurgical bond may help maintain the integrity of the mechanical interlock and the joint region, for example, in response to mechanical and thermal stresses applied to the components and the mechanical interlock, by allowing constrained relaxation of the components and the mechanical interlock.

Additionally, in some examples, the superalloy foil or superalloy powder may have relatively lower levels of melting point depressants, such as boron or silicon, than the braze material. The superalloy foil or superalloy powder thus may act as a melting point depressant sink into which the melting point depressants may diffuse from the braze material during the processing of the braze material. This may result in the melting point of the braze material being raised to provide improve high temperature capabilities to the resulting joint.

FIG. 1A is a conceptual and schematic diagram illustrating an exploded view of an example assembly 10 for joining a first component 12a and a second component 12b using a braze material 14 to form a mechanical interlock. At least one of first or second components 12a or 12b may include metal, alloy, or a ceramic-based structure, for example, a ceramic-matrix composite. In some examples, first and second components 12a and 12b (also referred to as "components 12a and 12b") may be joined to form an article or a portion of an article that is part of a high temperature mechanical system. For example, components 12a and 12b may be joined to form an article or a portion of nozzle guide vane (NGV) that is used in a high pressure or intermediate pressure stage in a gas turbine engine. In other examples, the article may include another component of a high temperature mechanical system, such as another component of a gas turbine engine. For example, the article may include a gas turbine engine blade alone or with a blade shroud, gas turbine engine vane, blade track, combustor liner, or the like.

Each of components 12a and 12b may include a metal or alloy, or a ceramic. In some examples, components 12a and 12b include substantially the same (e.g., the same or nearly the same) metal or alloy. In other examples, components 12a and 12b include different metals or alloys. In some examples, one or both of components 12a and 12b may include a Ni-, Co-, or Fe-based superalloy, or the like. The superalloy may include other additive elements to alter its mechanical and chemical properties, such as toughness, hardness, temperature stability, corrosion resistance, oxidation resistance, and the like. Any useful superalloy may be utilized in first or second components 12a or 12b, including, for example, Ni-based alloys available from Martin-Marietta Corp., Bethesda, MD, under the trade designation MAR-M246, MAR-M247; Ni-based alloys available from Cannon-Muskegon Corp., Muskegon, MI, under the trade designations CMSX-3, CMSX-4, CMSX-10, and CM-186; Co-based alloys available from Martin-Marietta Corp., Bethesda, MD, under the trade designation MAR-M509; and the like. The compositions of CMSX-3 and CMSX-4 are shown below in Table 1.

TABLE 1

|    | CMSX-3 (wt. %) | CMSX-4 (wt. %) |
|----|----------------|----------------|
| Cr | 8              | 6.5            |
| Al | 5.6            | 5.6            |
| Ti | 1              | 1              |
| Co | 5              | 10             |
| W  | 8              | 6              |
| Mo | 0.6            | 0.6            |
| Ta | 6              | 6              |
| Hf | 0.1            | 0.1            |
| Re |                | 3              |
| Ni | Balance        | Balance        |

One or both of components 12a and 12b may be made using at least one of casting, forging, powder metallurgy, molding, or additive manufacturing. In some examples, components 12a and 12b are made using the same process, while in other examples, components 12a and 12b are made using different processes.

In some examples, one or both of components 12a or 12b may include a ceramic or ceramic-matrix composite (CMC). The ceramic or CMC may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave. In some examples, the CMC may include a SiC/SiC CMC, or an oxide/oxide CMC. For example, an SiC/SiC or oxide/oxide CMC component may be joined to a metal or alloy component or another SiC/SiC or oxide/oxide CMC component.

Although FIG. 1A illustrates components 12a and 12b as each defining a simple, substantially curvilinear geometry, in other examples, one or both of first or second components 12a or 12b may define a more complex geometry, including simple or complex curves, overhangs, undercuts, internal cavities, or the like.

First component 12a defines at least one joining region 16a defining a joint surface 18a. Similarly, second component 12b defines at least one joining region 16b defining a joint surface 18b. In some examples, first and second joint surfaces 18a and 18b (also referred to as "joint surfaces 18a and 18b") may define complementary shapes. FIG. 1A illustrates joint surfaces 18a and 18b as defining substantially flat surfaces. In other examples, joint surfaces 18a and 18b may define other, more complex shapes, including, for example, simple or complex curves, overhangs, undercuts, apertures, annuluses, or the like.

Components 12a and 12b are positionable such that joining regions 16a and 16b are adjacent to each other and define a joint region (not shown in FIG. 1A). The joint region may include any kind of simple or complex joint, including, for example, at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joining regions 16a and 16b may have any corresponding geometries to define the surfaces of the joint region. For example, for a mortise and tenon joint, first component 12a may define a mortise (a cavity) and second component 12b may define a tenon (a projection that inserts into the mortise). As another example, for a splice joint, first component 12a may define a half lap, a bevel lap, or the like, and second component 12b may define a complementary half lap bevel lap, or the like.

In some examples, although not shown in FIG. 1A, assembly 10 may include a clamp, press, or other mechanism for exerting pressure between joining regions 16a and 16b during joining. The pressure between joining regions 16a and 16b may facilitate formation of the joint, e.g., by helping to at least one of maintain a gap at the joint region, to promote flow or migration of braze material 14, and to evacuate any gases or porosity in braze material 14, which may reduce porosity in the joint.

Figure 1B:
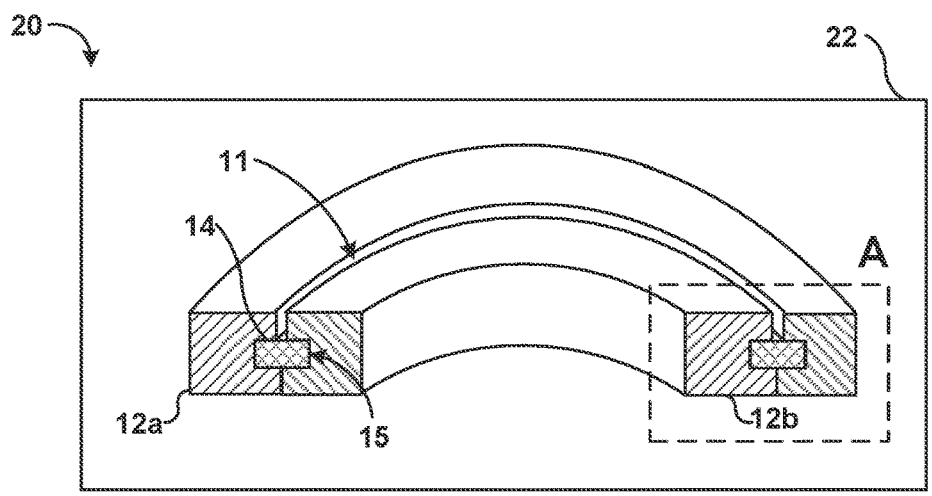
FIG. 1B is a conceptual and schematic diagram illustrating a partial view of an example system including the assembly of FIG. 1A in a furnace.

FIG. 1B is a conceptual and schematic diagram illustrating a partial view of an example system 20 including assembly 10 of FIG. 1A in a furnace 22. Assembly 10 may be assembled as shown in FIG. 1B, with braze material 14 disposed in a joint region 15 defined by joint surfaces 18a and 18b of joining regions 16a and 16b. In some examples, braze material 14 may include a wide gap braze material. For example, braze material 14 may include a powder mixture that has been sintered to form a pre-sintered preform (PSP). Sintering may reduce porosity compared to the powder, which may reduce porosity in joint region 15 during and after formation of the mechanical interlock. While a single joint region 15 is shown in the example assembly of FIG. 1B, in other examples, components 12a and 12b may define a plurality of respective joint regions, and braze material 14 may be introduced into respective joint regions of the plurality of joint regions. In some examples, different compositions of braze material 14 may be introduced into different joint regions, or in different portions of the same joint region.

In some examples, braze material 14 may include a Ni-based or Co-based wide gap braze alloy. Braze material 14 may include greater amounts of alloying elements that some other braze materials used in braze foils, which may contribute to improved mechanical properties, chemical properties, or both compared to some other braze materials used in braze foils. For example, braze material 14 may possess sufficient mechanical strength and high temperature oxidation resistance to be used in a nozzle guide vane in a gas turbine engine.

In some examples, braze material 14 may include both a braze alloy powder (a low-melt powder composition) and a superalloy powder (a high-melt powder composition). The low-melt alloy powder composition is an alloy, or a mixture of alloys, that substantially melts below a braze or joining temperature (hence the name "low-melt" or "braze powder"). In contrast, the high-melt alloy powder composition is an alloy, or a mixture of alloys, that remains substantially unmelted at the braze temperature, because the composition has a melting temperature above the braze temperature (hence the name "high-melt" or "superalloy powder"). In some implementations, the braze alloy powder and the superalloy powder may have specific powder mesh sizes, and may be produced by induction melting the braze alloy or the superalloy powder, respectively, in vacuum or an argon atmosphere, followed by argon gas atomization. Each individual powder component used in braze material 14 may be analyzed to confirm the particle size and chemical compositions.

In some examples, the low-melt powder composition includes an alloy or a mixture of alloys that melt at a temperature below about 1260° C. (about 2300° F.). The high-melt alloy powder composition may include a single high-melt alloy or a mixture of alloys that melts at a temperature of greater than about 1315° C. (about 2400° F.).

In some examples, the low-melt powder composition may include one or more alloy powders and includes between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1204° C. (about 2200° F.). In some examples, the low-melt powder composition also includes up to about 1 wt. % each of at least one of Ti, W, Mo, Re, Nb, Hf, Pd, Pt, Jr, Ru, C, Si, P, Fe, Ce, La, Y, or Zr. In some examples the low-melt alloy powder comprises a mixture of two or more low-melt alloys. For example, a low-melt alloy powder may include (a) about 35% of a first low-melt powder including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second low-melt powder including about 42 wt. % Ni, about 31 wt. % Cr, about 26 wt. % Ta, and about 1 wt. % B, with a liquidus temperature of about 1232° C. (about 2250° F.); and (c) about 20 wt. % of a third low-melt powder including about 64 wt. % Ni, about 6 wt. % Al, about 8 wt. % Co, about 4 wt. % W, about 4 wt. % Ta, about 3 wt. % Si, about 1 wt. % Re, about 1 wt. % Nb, and about 1 wt. % B, with a liquidus temperature of about 1093° C. (about 2000° F.).

In some examples, the high-melt powder composition may include an alloy or mixture of alloys with a chemistry that is the similar to or substantially the same (e.g., the same or nearly the same) as the alloy in first component 12, second component 14, or both. For example, in some implementations, to join a first component 12 and a second component 14 that include Ni-based superalloy components such as those made of MAR-M246 or 247, or CMSX-3 or -4, the high-melt powder composition may include between about 50 wt. % and about 70 wt. % Ni, between about 2 wt. % and about 10 wt. % Cr, between about 2 wt. % and about 10 wt. % Ta, between about 5 wt. % and about 15 wt. % Co, between about 2 wt. % and about 10 wt. % Al, between about 2 wt. % and about 10 wt. % W, between about 2 wt. % and about 4 wt. % Re, up to about 3 wt. % Mo, and up to about 3 wt. % Hf. In some examples, the high-melt powder composition also may include up to about 1 wt. % each of at least one of Ti, Nb, C, B, Si, or Zr. In some examples, the high-melt powder composition includes between about 55 wt. % and about 60 wt. % Ni, about 7 wt. % Cr, about 6 wt. % Ta, about 12 wt. % Co, about 6 wt. % Al, about 3 wt. % Re, about 1.5 wt. % Hf, and about 5 wt. % W.

The low-melt powder composition and the high-melt powder composition may be combined in any selected ratio. In some examples, braze material 14 may include a powder mixture consisting of between about 20 wt. % and about 80 wt. % low-melt powder composition and a balance high-melt powder composition (a ratio of between about 1:4 and about 4:1 low-melt:high-melt powder). In some cases, braze alloy powder may be a mixture of more than one braze alloys which are all powder. In some examples, the ratio may be between about 1:3 and about 3:1 low-melt:high-melt powder, such as a ratio between about 1:2 and about 2:1 low-melt:high-melt powder, or a ratio between about 1:1 and about 1:1.5 low-melt:high-melt powder. For example, braze material 14 may include between about 40 wt. % and about 50 wt. % low-melt alloy powder and between about 50 wt. % and about 60 wt. % high-melt powder, such as about 45 wt. % low-melt alloy powder and about 55 wt. % high-melt powder.

Hence, in some examples, braze material 14 may include between about 50 wt. % and about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B. In some examples, braze material 14 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, about 1 wt. % Mo, about 1 wt. % Hf, and, optionally, up to about 1% each at least one of Ti, Nb, Pd, Pt, Jr, Ru, C, B, Si, P, Mn, Fe, Ce, La, Y, or Zr. In some examples, braze material 14 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, between about 0.5 wt. % and about 1 wt. % Mo, between about 0.5 wt. % and about 1 wt. % Hf, between about 0.1 wt. % and about 0.5 wt. % Nb, between about 0.05 wt. % and about 3 wt. % Si, and between about 0.5 wt. % and about 2 wt. % B. In some examples, braze material 14 may include about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf; or may include between about 10.2 wt. % and about 11.3 wt. % Cr, between about 4.8 wt. % and about 5.1 wt. % Al, between about 9.1 wt. % and about 9.8 wt. % Co, between about 2.8 wt. % and about 3.3 wt. % W, between about 0.7 wt. % and about 0.9 wt. % Mo, between about 8.2 wt. % and about 8.8 wt. % Ta, between about 0.6 wt. % and about 0.8 wt. % B, about 0.3 wt. % Si, between about 1.5 wt. % and about 1.8 wt. % Re, between about 0.8 wt. % and about 0.9 wt. % Hf, between about 0.1 wt. % and about 0.2 wt. % Nb, and a balance Ni.

In selecting the proportions of components used in braze material 14, higher weight percentages of high-melt powder may provide better mechanical properties in view of their reduced levels of melting point depressants such as boron, silicon, or both. Conversely, higher percentages of low-melt powders that include higher levels of melting point depressants such as boron, silicon, or both may provide improved braze flow. A proper balance between mechanical properties and braze flow should be selected, for example, to promote flow of the braze material to ultimately at least partially conform to joint region 15, while yet retaining sufficient strength or rigidity to mechanically secure components 12a and 12b relative to each other.

In some examples, the sintered powder may then be cut or machined into a predetermined shape. For example, the predetermined shape may correspond to a shape of joint region 15. As described above, joint region 15 may include a relatively simple geometry as shown in FIG. 1A, or may include a more complex geometry, e.g., multiple planes or surfaces, simple or complex curves, overhangs, undercuts, internal cavities, or the like. Accordingly, the sintered powder may be cut or machined into a relatively simple shape, or a more complex, e.g., including curvature, angles, apertures, or the like to form braze material 14. Regardless of the complexity of the shape of PSP material 14 and depending upon the geometry of joint region 15, braze material 14 may include a substantially two-dimensional shape (e.g., a plane) or a three-dimensional shape (e.g., including curvature, planes at angles with respect to one another, and the like). In some examples, braze material 14 may include one or more of a putty, a paste, a sheet, a strip, or a pre-molded shape, or a pre-sintered preform, wherein the pre-molded shape at least partially conforms to the joint region. By utilizing braze material 14, alloys with desirable mechanical and chemical (e.g., high temperature oxidation resistance) may be utilized in a joining technique to join first component 12a and second component 12b.

For example, furnace 22 may be used to heat braze material 14 to a predetermined processing temperature to form an at least softened material (for example, a material that is relatively softer than braze material 14, or a partially, substantially, or completely melted material, or a flowable material). Furnace 22 may include a combustion, infrared, electric, induction, or any suitable source of thermal energy. In some examples, furnace 22 may include a furnace, for example, a vacuum furnace. While furnace 22 may be used to heat braze material 14, in some examples, furnace 22 may not be used, and instead, a different source of thermal energy may be used to heat braze material 14, for example, an external heat source. The at least softened material may flow, migrate, or otherwise at least partially occupy joint region 15, and on cooling, form a mechanical interlock in joint region 15.

Figure 1C:
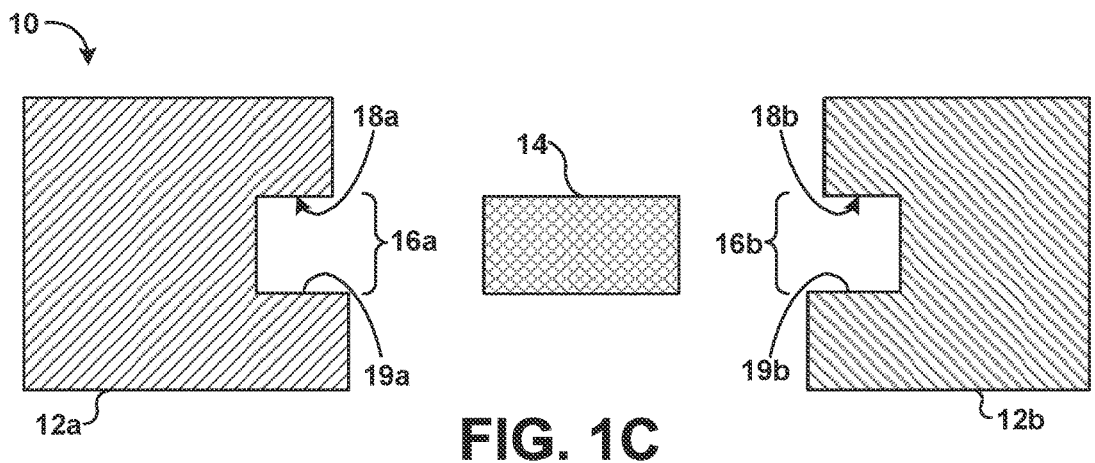
FIG. 1C is a conceptual and schematic diagram illustrating a partial sectional and exploded view of region A of the system of FIG. 1B.

FIG. 1C is a conceptual and schematic diagram illustrating a partial sectional and exploded view of region A of system 20 of FIG. 1B. An adhesion resistant material may be present in joint region 15 between a joint surface defined by joint region 15 and braze material 14. For example, a joint surface defined by joint region 15, for example, a surface of one or both of first or second joining regions 16a or 16b, may be coated with an adhesion resistant coating. One or both of joint surfaces 18a or 18b of joint region 15 may be respectively coated with adhesion resistant coating 19a or 19b. In some examples, adhesion resistant coating 19a and 19b may have the same compositions. In other examples, adhesion resistant coating 19a and 19b may have differing compositions. In some examples, one or both of adhesion resistant coatings 19a or 19b (collectively referred to as adhesion resistant coating 19) may include at least one of an oxidation resistant coating or a corrosion resistant coating. In some examples, an oxidation resistant coating may itself be a corrosion resistant coating. In some examples, at least a portion of adhesion resistant coating 19 may include an aluminide coating, for example, a platinum aluminide coating. In some examples, adhesion resistant coating 19 may include at least one nonreactive oxide. For example, the nonreactive oxide may be substantially nonreactive with respect to braze material 14. At least a portion of adhesion resistant coating 19 may act as a leave-in-place "stop-off", substantially preventing braze material 14 (or the at least softened material formed by heating braze material 14, or the mechanical interlock formed by cooling the at least softened material) from adhering to surfaces defined by joint region 15, for example, joint surfaces 18a and 18b. In some examples, adhesion resistant coating 19 present before, during, and after forming the joint avoids or substantially prevents introducing a gap (as contrasted with a stop-off removed after application). Thus, adhesion resistant coating 19 may result in a line-on-line fit or connection between components 12a and 12b and the mechanical interlock ultimately formed from braze material 14, without allowing braze material 14 to form a metallurgical bond or braze joint with components 12a and 12b.

While adhesion resistant coating 19 resists adherence or metallurgical bonding of the mechanical interlock formed from brazing material 14 to surfaces of joint region 15, the mechanical interlock still secures first component 12a to second component 12b or restrains first component 12a relative to second component 12b. For example, the shape and geometry of the mechanical interlock (for example, substantially conforming to joint region 15) may mechanically lock or secure a portion of first component 12a relative to a respective portion of second component 12b. In some examples, the mechanical interlock at least partially surrounds at least one of first component 12a or second component 12b. For example, the mechanical interlock may surround a perimeter subtending an angle greater than 180°, or greater than 210°, or greater than 240°, or greater than 270°, or greater than 300°, or substantially 360° (for example, within 1°, 5°, or 10° of 360°) about a central axis defined respectively by first component 12a or second component 12b. In some examples, the mechanical interlock may form a ring, or a sleeve, surrounding one or both of components 12a or 12b. In some examples, the mechanical interlock may be exterior to an exterior surface defined by one of components 12a or 12b, and interior to an interior surface defined by the other of components 12a or 12b. For example, in the examples shown in FIGS. 1A, 1B, and 1C, braze material 14 (and the mechanical interlock ultimately formed from braze material 14) surrounds and is exterior to (radially outward of) second component 12b, while being interior to (radially inward of) first component 12a. However, any suitable configuration of braze material 14 relative to components 12a and 12b that secures components 12a and 12b together may be used.

The mechanical interlock ultimately formed from braze material 14 may possess sufficient mechanical strength and high temperature oxidation resistance to be utilized in a high temperature mechanical system, such as a nozzle guide vane in a gas turbine engine. Further, by utilizing a PSP in some examples, the joint may include reduced porosity compared to a joint formed using a braze powder, and positioning of a PSP may be easier and more precise than with a braze powder. In this way, a PSP may facilitate the formation of an article from multiple, smaller components, easing or reducing the cost of forming the article.

Thus, braze material 14 can be formed into structures or otherwise introduced into joint region 15, while having the ability to change shape or "morph" during a high temperature furnace operation from a pliable or ductile green state (or even a semi-rigid state when pre-sintered) into a state that further softens and has the ability to substantially conform to the shape of joint region 15 or a cavity or channel in which braze material 14 is placed. Such deforming of braze material 14 may be accomplished at a temperature well below the melting point of components 12a or 12b, for example, without braze material 14 itself melting into a full liquid state (in contrast with bi-casting, which may require a liquid molten state). However, in other examples, while braze material 14 may be molten or heated to a liquid state, components 12a or 12b themselves may be maintained in a solid state, retaining the integrity of components 12a and 12b. In some examples, as described elsewhere in the disclosure, braze material 14 may be formed into multiple sections placed adjacent to each other in joint region 15. In such a configuration, the multiple sections will securely bond and fuse to each other during a high temperature furnace operation.

In some examples, the melting characteristics of braze material 14 may change in response to high temperature exposure. For example, braze material 14 may include a relatively small percentage of a low melting component, for example, brazing powder, and a relatively higher percentage of a high melting component, for example, superalloy. The low melting component may include an alloy additive that depresses the melting point of the low melting component, causing the low melting component to liquefy at this lower temperature, causing braze material 14 to soften and slip (and unite if more than one strip is used) during the furnace operation. However, the alloy addition that depresses the melting point of the low melting component may diffuse during the furnace operation (or during a post-furnace diffusion heat treatment) into the larger volume of high melting component, for example, superalloy. Such diffusion may raise the re-melt temperature of the mechanical interlock ultimately formed from braze material 14, such that the mechanical interlock (morphed and fused) material formed from braze material 14 transforms into a rigid metallic structure, (for example a "ring") after the furnace operation and when in subsequent use at high temperature operating conditions.

Thus, after the completion of the thermal cycle (and after an optional diffusion heat treat cycle) braze material 14 may transform into an integrally shaped and consolidated mechanical interlock (in some examples, a "ring") trapped in cavities or channels bridging between components 12a and 12b. The mechanical interlock formed from braze material 14 may thus function as a high strength, high temperature capable (closely conforming) structural member with material properties similar to a high temperature superalloy, for example, superalloy constituent(s) used in the formulation of braze material 14.

Figure 2:
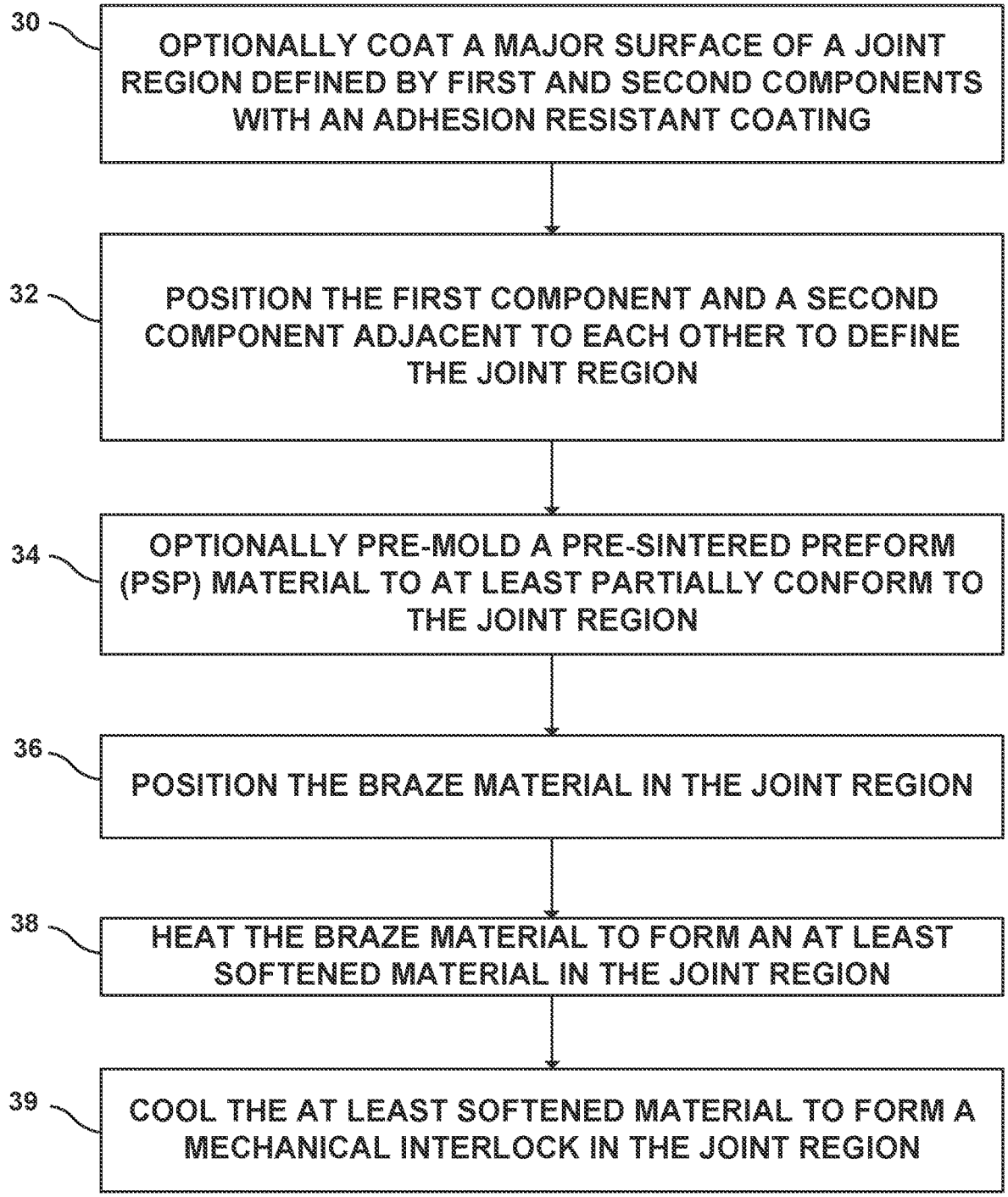
FIG. 2 is a flow diagram illustrating an example technique for mechanically joining components including using a braze material without metallurgically bonding the components.

FIG. 2 is a flow diagram illustrating an example technique for joining components 12a and 12b using braze material 14. The technique of FIG. 2 will be described with reference to assembly 10 of FIGS. 1A, 1B, and 1C for purposes of illustration only. It will be appreciated that the technique of FIG. 2 may be performed with a different assembly or system, or that assembly 10 may be used in a different joining technique.

In some examples, the example technique of FIG. 2 includes optionally coating a joint surface of joint region 15 defined by first and second components 12a and 12b with adhesion resistant coating 19 (30). The coating technique may include physical vapor deposition, chemical vapor deposition, plasma deposition, spraying, deposition of a liquid, marker, or putty, atmospheric exposure at high temperatures, or any other suitable coating technique. In some examples, the example technique may not include the coating step (30), and instead, pre-coated components 12a and 12b may be used. The coating (30) may be performed prior to positioning braze material 14 in joint region 15. In some examples, the technique of FIG. 2 may include positioning at least one adhesion resistant material within joint region 15, e.g., between braze material 14 and joint surfaces 18a and 18b, in addition to or instead of coating a joint surface of joint region 15 defined by first and second components 12a and 12b with adhesion resistant coating 19 (30).

Although not shown in FIG. 2, in some examples, joint surfaces 18a and 18b of components 12a and 12b, respectively, may be inspected and cleaned, for example, before the coating (30), after the coating (30), or before the positioning (32). The cleaned joint surfaces 18a and 18b may produce a more uniform joint than uncleaned joint surfaces.

The technique of FIG. 2 includes positioning components 12a and 12b to define joint region 15 (32). For example, as shown in FIGS. 1B and 1C, components 12a and 12b may be positioned so that joining regions 16a and 16b are near each other. As described elsewhere in the disclosure, the geometry of joint region 15 may depend on the type of joint defined by joint surfaces 18a and 18b and may include, for example, a bridle joint, a butt joint, a scarf joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint.

In some examples, the example technique of FIG. 2 optionally includes pre-molding braze material 14 to at least partially conform to joint region 15 (34), e.g., in examples in which braze material 14 includes a PSP. For example, the molding (34) may include stamping, cutting, rolling, pressing, imprinting, or otherwise molding braze material 14 in a mold to provide a predetermined shape to braze material 14. In some examples, the molding (34) may include preparing strips, sheets, tubes, tapes, or any suitable shapes from braze material 14. In some examples, braze material 14 may be molded into a unitary pre-molded shape, for example, a continuous shape. In other examples, braze material 14 may be molded into discrete shapes, for example, having different shapes or sizes. As joint region 15 may include a relatively simple geometry or a more complex geometry, braze material 14 may be cut or machined into a relatively simple shape, or a more complex shape, e.g., including curvature, angles, apertures, or the like. Different surfaces of the same piece or different pieces of pre-molded braze material 14 may conform to respective different surfaces at least partially defined by joint region 15. In some examples, the example technique may not include the pre-molding (34), and instead, no particular initial shape or form may be provided to braze material 14.

The technique of FIG. 2 also includes disposing braze material 14 in joint region 15 (36). As described above, braze material 14 may define a predetermined shape that at least partially corresponds to the geometry of joint region 15. Braze material 14 may be disposed in joint region 15 such that respective surfaces of braze material 14 contact respective joint surfaces of joint region 15, for example, joint surfaces 18a and 18b. In some examples, the positioning (36) includes introducing a single piece or unit of braze material 14 into joint region 15. In other examples, the positioning may include introducing different pieces of braze material 14 into respective predetermined portions of joint region 15.

In some examples, the positioning of components 12a and 12a (32) occurs prior to the disposing braze material 14 in joint region 15 (36). In some such examples, braze material 14 may be introduced into joint region 15 through or via an opening defined by joint region 15, for example, opening 11 shown in FIG. 1B. In other examples, the positioning of components 12a and 12a (32) occurs after braze material 14 is disposed within part of joint region 15 (36). For example, a portion of PSP material 14 may be placed in contact with or secured into a portion of one of joint surfaces 18a or 18b, followed by the positioning (32) of components 12a and 12b to resulting in bringing the other of joint surfaces 18a or 18b in contact with PSP material 14. In some examples, a first portion of braze material 14 may be introduced into joint region 15 (or portion of a component defining a portion of joint region 15) before the positioning of components 12a and 12a (32), and a second portion of braze material 14 may be introduced into joint region 15 (or portion of a component defining a portion of joint region 15) after the positioning (32). In some examples, a clamp, press, or other mechanism may be used to compress braze material 14 between joint regions 16a and 16b to cause intimate contact between joint surfaces 18a and 18b and surfaces of braze material 14, although intimate contact between joint surfaces 18a and 18b and surfaces of braze material 14 is not required, since no metallurgical bond is formed between braze material 14 and joint surfaces 18a and 18b.

The technique of FIG. 2 further includes heating braze material 14 to a processing temperature to melt or soften at least part of braze material 14 (38). In some examples, braze material 14 may be heated in a furnace or a closed retort, and components 12a and 12b may be heated with braze material 14. In some examples, the furnace or closed retort may enclose a vacuum or substantially inert atmosphere (e.g., an atmosphere including constituents that substantially do not react with components 12a and 12b and braze material 14 at the temperatures and pressures experienced by the interior of the furnace or closed retort). In some examples, braze material 14 may be heated by a local heat source, for example, a laser, an e-beam, or any suitable directed energy source that may heat braze material 14 without substantially heating components 12a or 12b.

Regardless of the heat treatment used for melting or softening at least a portion of braze material 14 (38), braze material 14 may be allowed to cool to ambient temperature to form a solid (for example, the mechanical interlock) and join components 12a and 12b (39). The cooling of braze material 14 (39) may include one or both of active cooling, where forced convection, or conduction by contact with a relatively cooler medium may be used to ultimately draw away heat from braze material 14 or passive cooling, where braze material 14 may be allowed to cool by releasing heat to the ambient environment and components 12a and 12b. In examples in which assembly 10 is heated in furnace 22, assembly 10 may be removed from furnace 22 before cooling braze material 14 (39).

Thus, the example technique of FIG. 2 may be used to form a mechanical interlock between components 12a and 12b from braze material 14 in assembly 10 of FIGS. 1A, 1B, and 1C, without forming a metallurgical bond between components 12a and 12b. Although FIG. 1A illustrates a simplified conceptual and schematic view of an example first component 12a, an example second component 12a, and an example braze material 14, in other examples, example assemblies may include components and braze material 14 defining a more complication geometry, for example, as described with reference to FIGS. 3A to 8. The example technique of FIG. 2 may be used to process any example assemblies according to the disclosure to form mechanical interlocks between components.

Figure 3A:
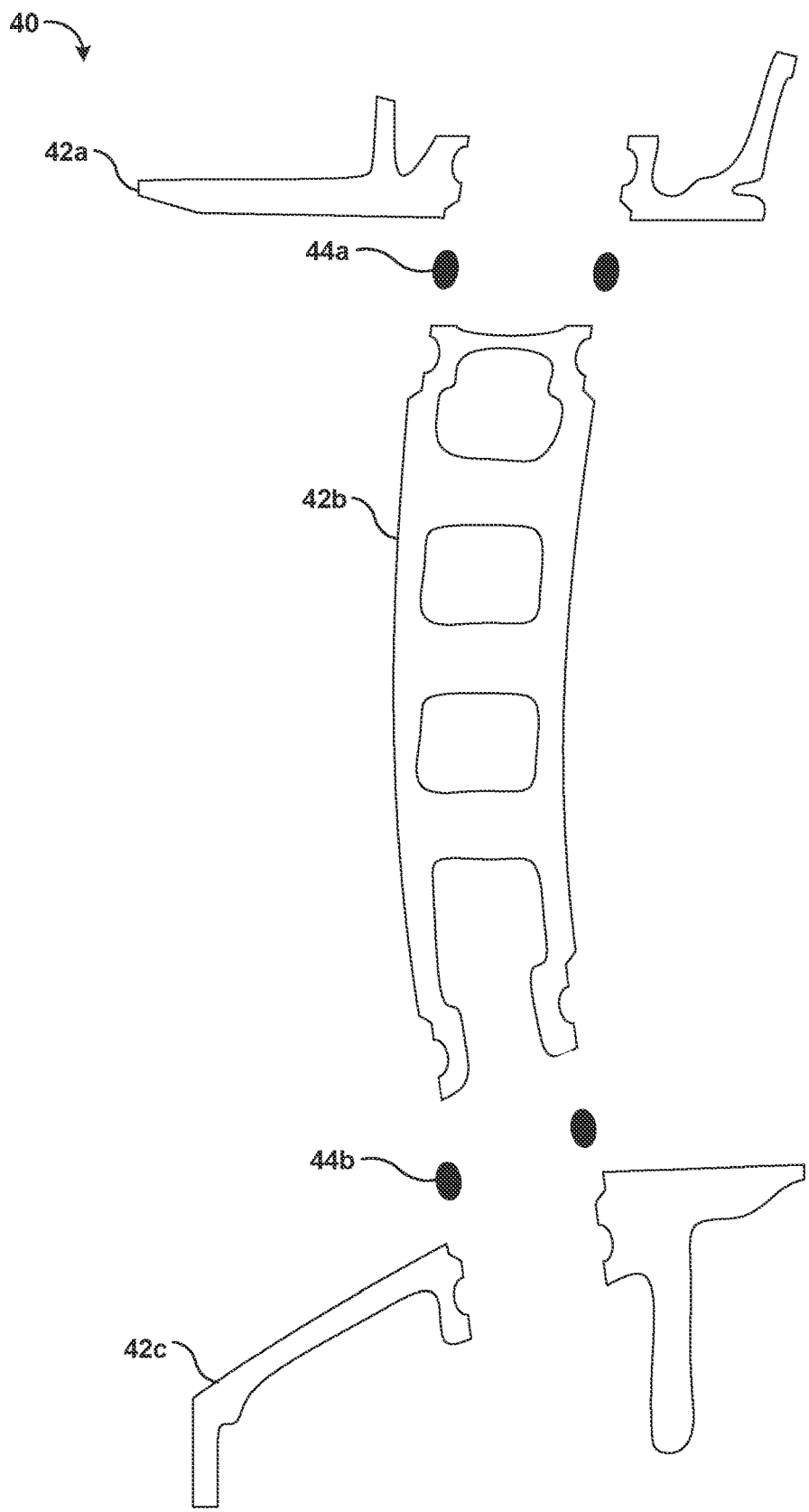
FIG. 3A is a conceptual and schematic diagram illustrating an exploded cross-sectional view of an example assembly including components and a mechanical interlock including a braze material between components.
Figure 3B:
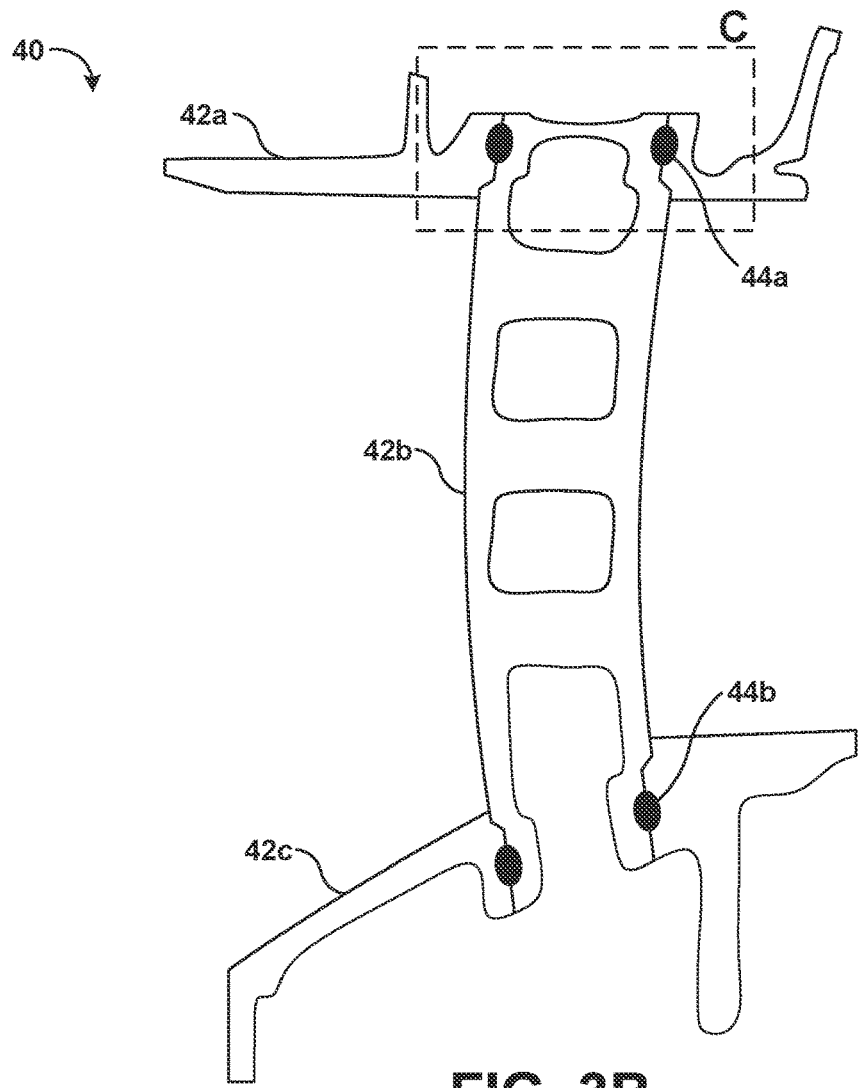
FIG. 3B is a conceptual and schematic diagram illustrating an assembled cross-sectional view of the example assembly of FIG. 3A.
Figure 3C:
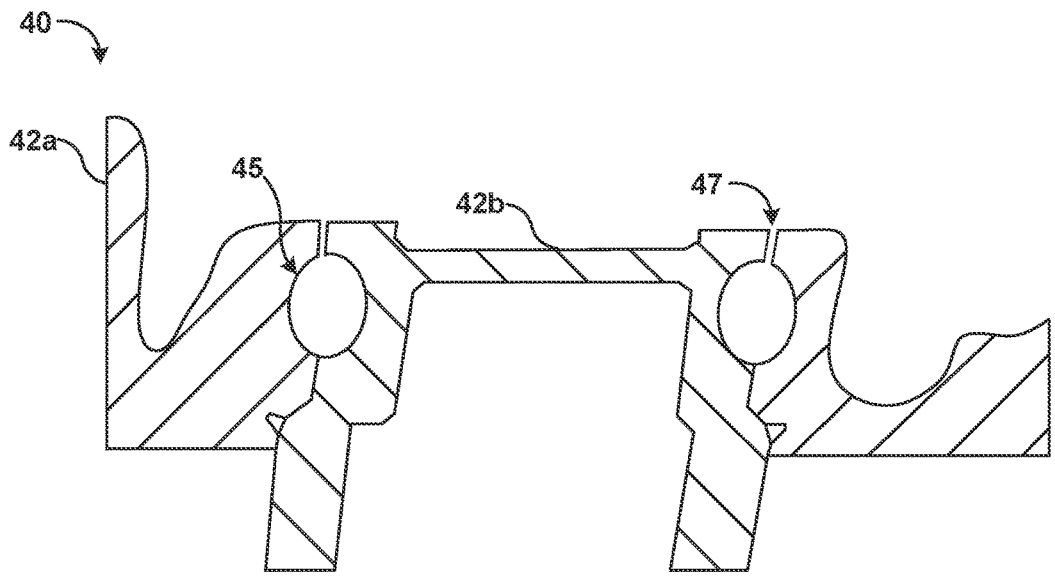
FIG. 3C is a conceptual and schematic diagram illustrating a partial cross-sectional view of region C of the assembly of FIG. 0.3B.

For example, FIG. 3A is a conceptual and schematic diagram illustrating an exploded cross-sectional view of an example assembly 40 including components (42a, 42b, and 42c) and braze material (44a and 44b) between components 42a, 42b, and 42c. FIG. 3B is a conceptual and schematic diagram illustrating an assembled cross-sectional view of assembly 40 of FIG. 3A. FIG. 3C is a conceptual and schematic diagram illustrating a partial cross-sectional view of region C of assembly 40 of FIG. 3B. In FIG. 3C, braze material 44a is removed to show a joint region 45 defined by components 42a and 42b.

In the example illustrated in FIG. 3A, component 42a of assembly 40 defines a nozzle guide vane (NGV) for a gas turbine engine, component 42b defines an airfoil, and component 42c defines a platform. Each of components 42a, 42b, or 42c may be formed of a metal or alloy, such as a Ni- or Co-based superalloy, or include a ceramic-based structure, for example, a ceramic-matrix composite. Further, components 42a, 42b, or 42c may be formed of the same metal or alloy, or of different metals or alloys, or ceramics. In the example shown in FIGS. 3A, 3B, and 3C, component 42a surrounds an exterior of component 42b, and joint region 45 in FIG. 3C surrounds component 42b. Thus, joint region 45 includes both channels or voids shown in the left and right portions of FIG. 3C. Similarly, joint region 45 defines a continuous opening 47 surrounding component 42b. For example, joint region 45 may follow a perimeter of an airfoil blade, or any predetermined path.

As shown in FIG. 3B, the joint region between components 42a and 42b is occupied by braze material 44a, and the joint region between components 42b and 42c is occupied by braze material 44b. Thus, components 42a, 42b, and 42c possess a more complex geometry than that shown in FIGS. 1A to 1C. Braze materials 44a and 44b accordingly include a more complex geometry, shaped to substantially conform to the geometry of the respective joint regions in which braze materials 44a and 44b are positioned. Upon completion of the joining technique, a mechanical interlock formed from braze material 44a mechanically restrains components 42a and 42b relative to each other, and a mechanical interlock formed from braze material 44b mechanically restrains components 42b and 42c relative to each other. The mechanical interlock surrounds component 42b. In this way, braze materials 44a and 44b are used to mechanically join three components 42a, 42b, and 42c, to form an assembly 40 with a more complex geometry, without forming metallurgical bonds between the respective components 42a, 42b, and 42c. This may reduce manufacturing time and cost compared to forming assembly 40 from a single casting.

Figure 4:
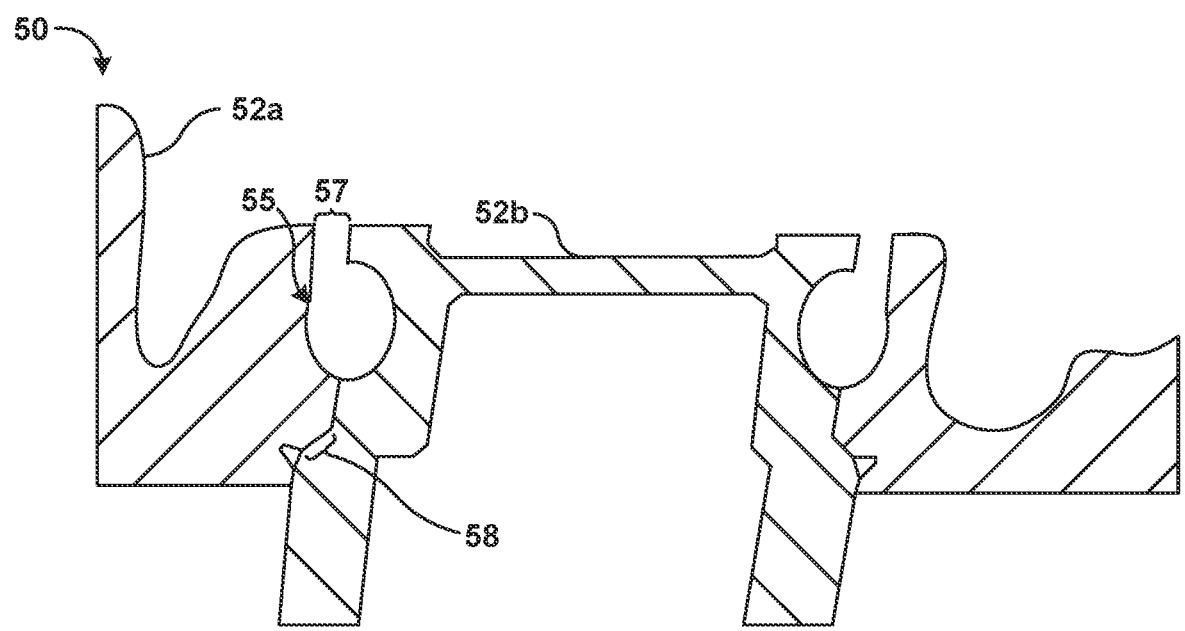
FIG. 4 is a conceptual and schematic diagram illustrating a partial cross-sectional view of an example assembly including components and defining a joint region for forming a mechanical interlock including a braze material.

FIG. 4 is a conceptual and schematic diagram illustrating a partial cross-sectional view of an example assembly 50 including components 52a and 52b and defining a joint region 55 for forming a mechanical interlock. Components 52a and 52b may be substantially similar to components 42a and 42b described with reference to FIG. 3. However, in some examples, components 52a and 52b define a conical seal interface 58. For example, conical seal interface 58 may be defined between components 52a and 52b proximate to and outside of joint region 55. Conical seal interface 58 may provide an alternate load path independent from the joint for supporting an inward load between components 42a and 42b. Such an inward load may be a result of operating conditions of components 42a and 42b, for example, during engine operation. In contrast with components that no not define such a conical seal interface, providing conical seal interface 58 may allow for modified machining of joint region 55. For example, while FIGS. 3 and 4 are not uniformly drawn to scale, and distances may be exaggerated for illustration, joint region 55 of assembly 50 may be provided with an opening 57 as shown in FIG. 4 that is relatively wider than opening 47 of joint region 45 of assembly 40 shown in FIG. 3C (below) because inward loading is being supported by conical seal interface 58.

Such a relatively wider opening may provide a "trench" to expose partial access to joint region 57 for installing braze material in joint region 55 surrounding component 52b. Braze material may be introduced through opening 57 into joint region 55 in one or more forms or states, as described with reference to FIGS. 5 to 8, for example, a paste, putty, strips, pre-molded shape, or a pre-sintered preform (PSP).

Figure 5:
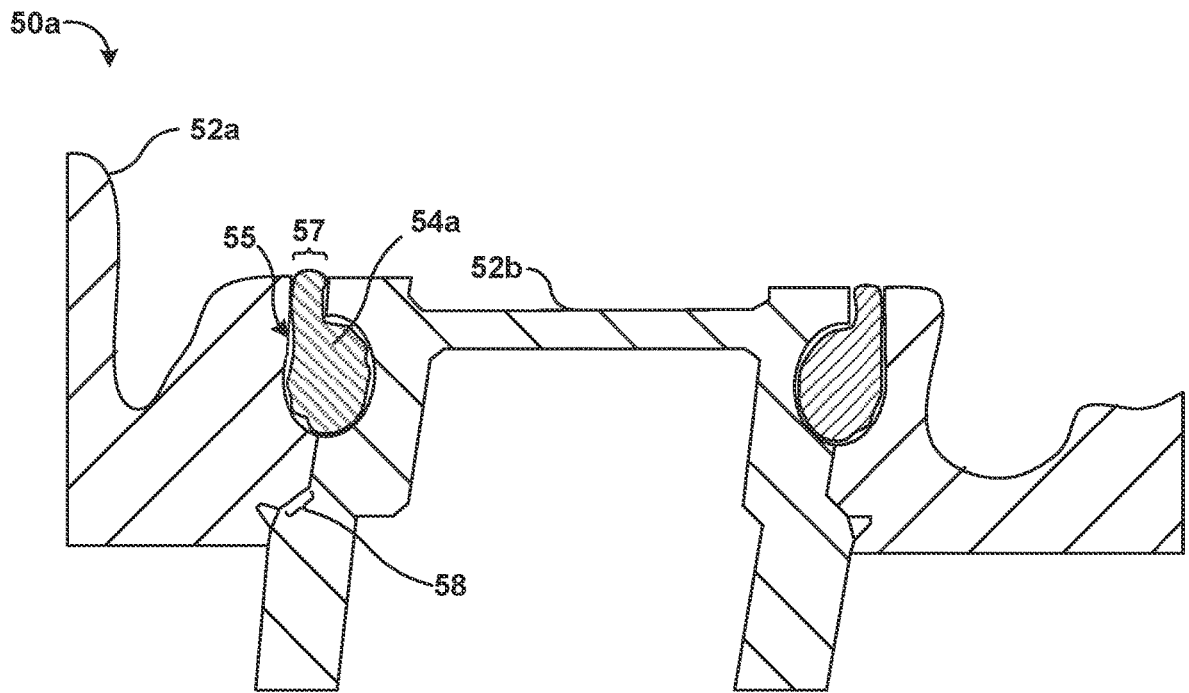
FIG. 5 is a conceptual and schematic diagram illustrating a partial cross-sectional view of an example assembly including components and braze paste that forms a mechanical interlock.

FIG. 5 is a conceptual and schematic diagram illustrating a partial cross-sectional view of example assembly 50a including components 52a and 52 and braze paste 54a. Assembly 50a is substantially similar to assembly 50 of FIG. 4, with braze paste 54a introduced into joint region 55. Braze paste 54a may include components similar to braze material 14 or other braze material described elsewhere in the disclosure. Braze paste 54a may additionally include optional components, for example, a carrier, a plasticizer, a softener, or a binder, to promote the formation of a paste. Using braze paste 54a as opposed to solid or powdered braze material may allow braze material to be introduced precisely into joint region 55 without creating powder or other waste, and may allow controlled introduction, for example, by extrusion from a nozzle, or otherwise being pressed or pushed intro joint region 55. Upon heating, braze paste 54a may flow, deform, migrate, or otherwise form an at least softened material that at least partly conforms to joint region 55, and upon cooling, form a mechanical interlock in joint region 55. The mechanical interlock mechanically restrains components 52a and 52b relative to each other. In some examples, the mechanical interlock formed from braze paste 54a at least partially surrounds component 52b. In some examples, the mechanical interlock substantially surrounds component 52b, securing component 52a to 52b about component 52 in the region adjacent joint region 55. In this way, braze paste 54a is used to mechanically join components 52a and 52b to form assembly 50a with a more complex geometry, without forming metallurgical bonds between the respective components 52a and 52b. This may reduce manufacturing time and cost compared to forming assembly 50a from a single casting.

Figure 6:
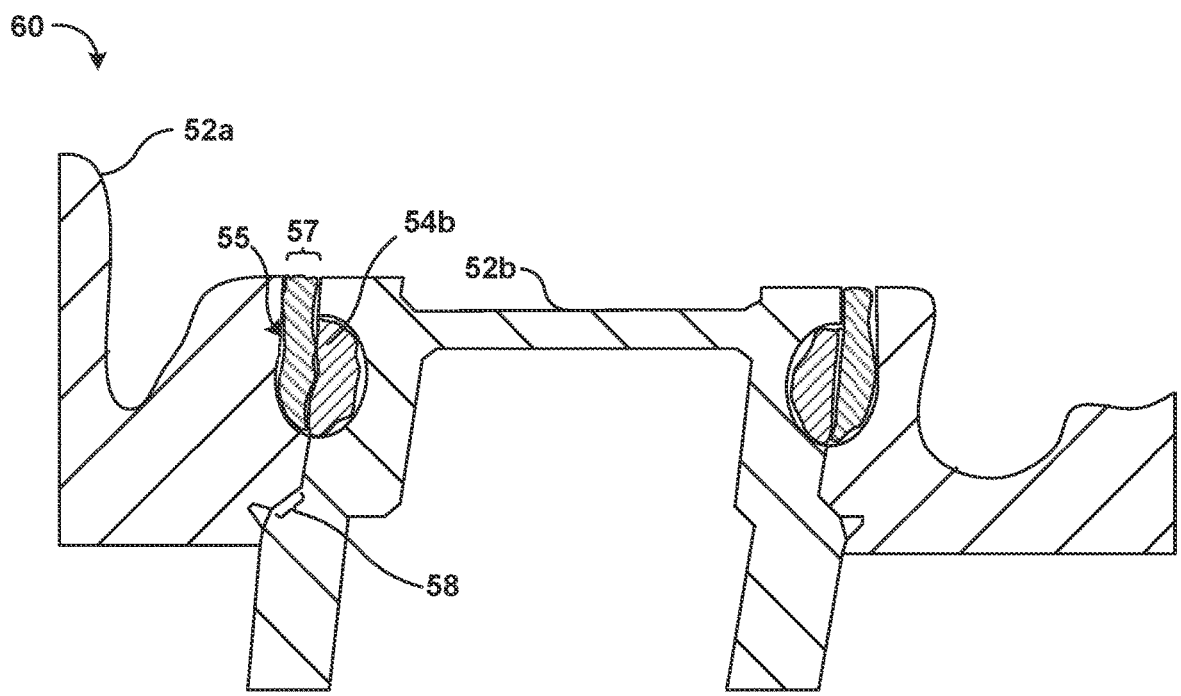
FIG. 6 is a conceptual and schematic diagram illustrating a partial cross-sectional view of an example assembly including components and braze putty that forms a mechanical interlock.

FIG. 6 is a conceptual and schematic diagram illustrating a partial cross-sectional view of an example assembly 60 including components 52a and 52b and braze putty 54b. Assembly 60 is substantially similar to assembly 50 of FIG. 4, with braze putty 54b introduced into joint region 55. Braze putty 54b may include components similar to braze material 14 or other braze material described elsewhere in the disclosure. Braze putty 54b may additionally include optional components, for example, a carrier, a plasticizer, a softener, or a binder, to promote the formation of a putty. Using braze putty 54b as opposed to solid or powdered braze material may allow braze material to be introduced precisely into joint region 55 without creating powder or other waste, and may allow controlled introduction, for example, by extrusion from a nozzle, or otherwise being pressed or pushed intro joint region 55. braze putty 54b may include more than one piece, for example, as shown in FIG. 6. Using multiple pieces of braze putty 54b may allow easier introduction of putty 54b into joint region 55. Upon heating, braze putty 54b may flow, deform, migrate, or otherwise form an at least softened material that at least partly conforms to joint region 55, and upon cooling, form a mechanical interlock in joint region 55. The mechanical interlock mechanically restrains components 52a and 52b relative to each other. In some examples, the mechanical interlock formed from braze putty 54b at least partially surrounds component 52b. In some examples, the mechanical interlock substantially surrounds component 52b, securing component 52a to 52b about component 52 in the region adjacent joint region 55. In this way, braze putty 54b is used to mechanically join components 52a and 52b to form assembly 60 with a more complex geometry, without forming metallurgical bonds between the respective components 52a and 52b. This may reduce manufacturing time and cost compared to forming assembly 60 from a single casting.

Figure 7:
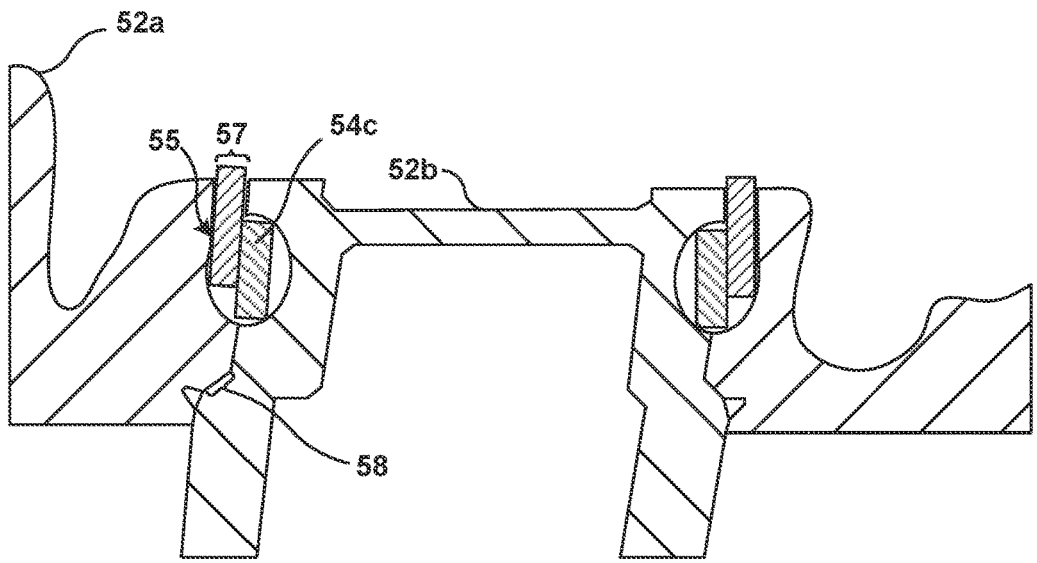
FIG. 7 is a conceptual and schematic diagram illustrating a partial cross-sectional view of an example assembly including components and pre-sintered preform strips including braze material that form a mechanical interlock.

FIG. 7 is a conceptual and schematic diagram illustrating a partial cross-sectional view of an example assembly 70 including components 52a and 52b and pre-sintered preform (PSP) strips 54c including braze material. Assembly 70 is substantially similar to assembly 50 of FIG. 4, with PSP strips 54c introduced into joint region 55. PSP strips 54c may include components similar to PSP material 14 or other PSP material described elsewhere in the disclosure. In some examples, PSP strips 54c may allow substantially plastic deformation, substantially retaining deformed shape. For example, if PSP strips 54c are bent into a circle, ellipse, or any predetermined curve, PSP strips 54c may substantially retain the predetermined deformed shape. Using PSP strips 54c as opposed to conventional braze material may allow PSP material to be introduced rapidly and precisely into joint region 55 without creating powder or other waste, and may allow controlled introduction, for example, by a pick-and-place operation, or otherwise being pressed or pushed intro joint region 55. PSP strips 54c may include more than one piece, for example, as shown in FIG. 7. Using multiple pieces of PSP strips 54c may allow easier introduction of PSP strips 54c into joint region 55. Upon heating, PSP strips 54c may flow, deform, migrate, or otherwise form an at least softened material that at least partly conforms to joint region 55, and upon cooling, form a mechanical interlock in joint region 55. In some examples, the at least softened material from different pieces of PSP strips 54c may merge into a cohesive or unitary softened material. The mechanical interlock mechanically restrains components 52a and 52b relative to each other. In some examples, the mechanical interlock formed from PSP strips 54c at least partially surrounds component 52b. In some examples, the mechanical interlock substantially surrounds component 52b, securing component 52a to 52b about component 52 in the region adjacent joint region 55. In this way, PSP strips 54c are used to mechanically join components 52a and 52b to form assembly 70 with a more complex geometry, without forming metallurgical bonds between the respective components 52a and 52b. This may reduce manufacturing time and cost compared to forming assembly 70 from a single casting.

Figure 8:
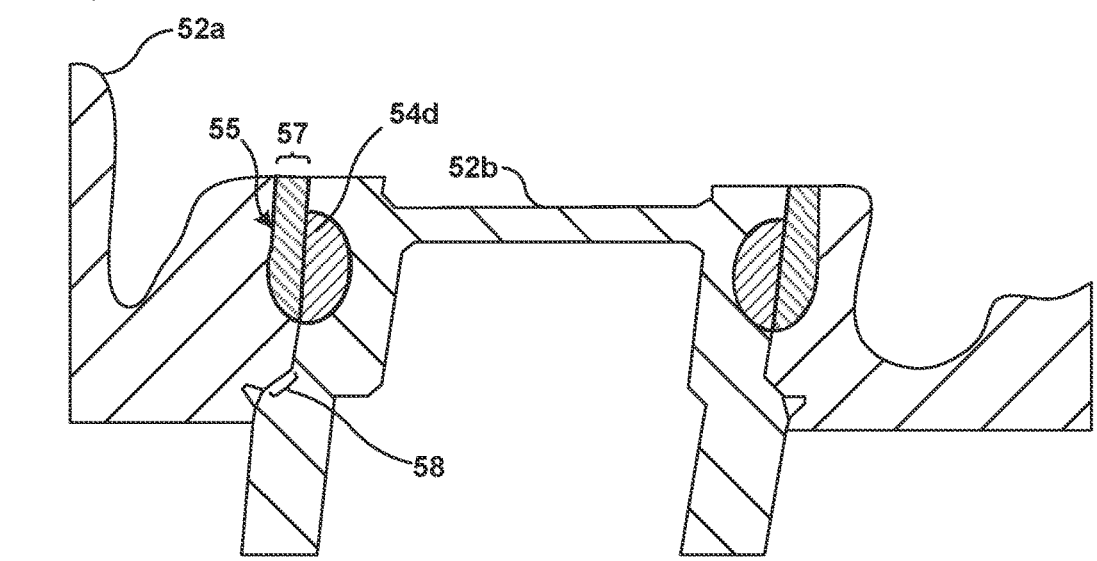
FIG. 8 is a conceptual and schematic diagram illustrating a partial cross-sectional view of an example assembly including components and pre-molded pre-sintered preform strips including braze material that form a mechanical interlock.

FIG. 8 is a conceptual and schematic diagram illustrating a partial cross-sectional view of an example assembly 80 including components 52a and 52b and pre-molded pre-sintered preform (PSP) strips 54d including braze material. Assembly 80 is substantially similar to assembly 50 of FIG. 4, with pre-molded PSP strips 54d introduced into joint region 55. Pre-molded PSP strips 54d may relatively conform better to joint region 55, requiring a lower extent or degree of flow or migration to eventually form a mechanical interlock in joint region 55. In some examples, pre-molded PSP strips 54d may have a shape and geometry that permits introduction of pre-molded PSP strips 54d through opening 57 without substantially changing the conformance of pre-molded PSP strips 54d. In some such examples, pre-molded PSP strips 54d may be introduced into joint region 55 through opening 57. In other examples, pre-molded PSP strips 54d may not have a geometry or shape permitting introduction through opening 57. In some examples, pre-molded PSP strips 54d may be first fitted or (at least temporarily) secured in contact with or within one of components 52a or 52b, and then the other of components 52a or 52b may be positioned adjacent the other of components 52a or 52b such that pre-molded PSP strips are ultimately disposed in joint region 55. Pre-molded PSP strips 54d may include components similar to PSP material 14 or other PSP material described elsewhere in the disclosure. In some examples, pre-molded PSP strips 54d may allow substantially plastic deformation, substantially retaining deformed shape. For example, if pre-molded PSP strips 54d are bent into a circle, ellipse, or any predetermined curve, pre-molded PSP strips 54d may substantially retain the predetermined deformed shape. Using pre-molded PSP strips 54d as opposed to conventional braze material may allow PSP material to be introduced rapidly and precisely into joint region 55 without creating powder or other waste, and may allow controlled introduction, for example, by a pick-and-place operation, or otherwise being pressed or pushed intro joint region 55. Pre-molded PSP strips 54d may include more than one piece, for example, as shown in FIG. 8. Using multiple pieces of PSP strips 54c may allow easier introduction of pre-molded strips 54d into joint region 55. Upon heating, pre-molded PSP strips 54d may flow, deform, migrate, or otherwise form an at least softened material that at least partly conforms to joint region 55, and upon cooling, form a mechanical interlock in joint region 55. In some examples, the at least softened material from different pieces of pre-molded PSP strips 54d may merge into a cohesive or unitary softened material. In some examples, the mechanical interlock formed from pre-molded PSP strips 54d at least partially surrounds component 52b. The mechanical interlock mechanically restrains components 52a and 52b relative to each other. In some examples, the mechanical interlock substantially surrounds component 52b, securing component 52a to 52b about component 52 in the region adjacent joint region 55. In this way, pre-molded PSP strips 54d are used to mechanically join components 52a and 52b to form assembly 80 with a more complex geometry, without forming metallurgical bonds between the respective components 52a and 52b. This may reduce manufacturing time and cost compared to forming assembly 80 from a single casting.

Thus, a mechanical interlock formed from braze material may be used to mechanically join components having relatively complex geometries and defining relatively complex joint regions without forming metallurgical bonds with the components.

Figure 9A:
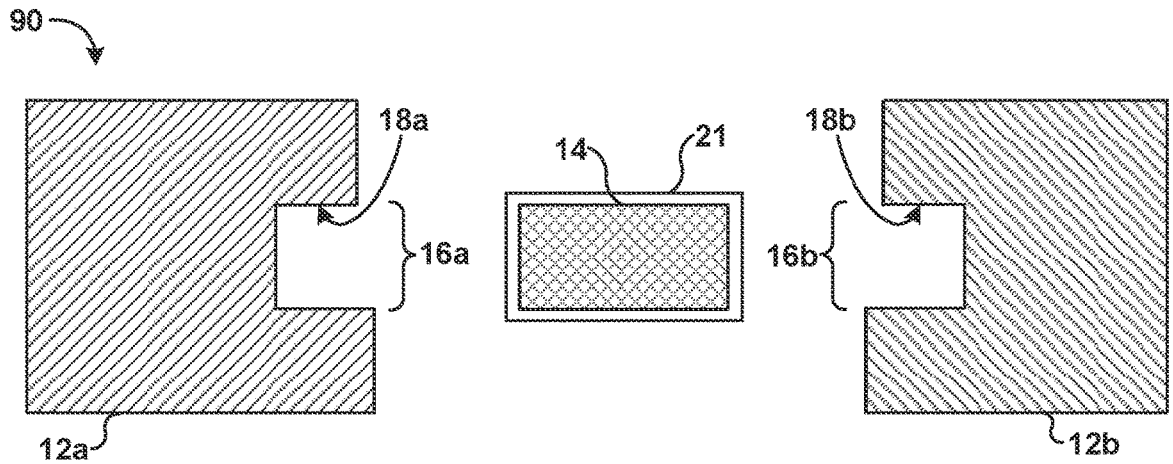
FIG. 9A is a conceptual and schematic diagram illustrating a partial sectional and exploded view of a region similar to region A of the system of FIG. 1B.

In some examples, instead of or in addition to using an adhesion resistant coating to prevent metallurgical bonding between a braze material and adjacent components, a superalloy foil or powder may be used as an adhesion resistant material. The superalloy foil or powder may be positioned between the braze material and surfaces of the components to be mechanically joined. The superalloy foil or powder may be selected to have a melting temperature higher than the processing temperature to which the braze material is heated, such that the superalloy foil or powder does not melt during the formation of the mechanical interlock from the braze material. As such, the superalloy foil or powder forms a physical barrier between the braze material and the components to prevent a metallurgical bond from forming between the braze material and the components. FIG. 9A is a conceptual and schematic diagram illustrating a partial sectional and exploded view of a region similar to region A of system 20 of FIG. 1B.

Assembly 90 of FIG. 9A is similar to assembly 10 of FIGS. 1A-1C except for the differences described herein. For example, like assembly 10, assembly 90 incudes first and second components 12a and 12b. First component 12a defines joining region 16a and joint surface 18a. Second component 12b defines joining region 16b and joint surface 18b. Assembly 90 also includes braze material 14, which may include any of the braze materials described herein.

Unlike assembly 10 of FIGS. 1A-1C, assembly 90 includes a superalloy foil or powder 21 between braze material 14 and joint surfaces 18a and 18b, and may omit adhesion resistant coating 19a and/or 19b. Superalloy foil or powder 21 may include any suitable superalloy, such as a Ni- or Co-based superalloy. For example, superalloy foil or powder 21 may include Ni-based alloys available from Martin-Marietta Corp., Bethesda, MD, under the trade designation MAR-M246, MAR-M247; Ni-based alloys available from Cannon-Muskegon Corp., Muskegon, MI, under the trade designations CMSX-3, CMSX-4, CMSX-10, and CM-186; Co-based alloys available from Martin-Marietta Corp., Bethesda, MD, under the trade designation MAR-M509; or the like. The superalloy of superalloy foil or powder 21 may be selected to have a melting temperature that is greater than the processing temperature to which braze material 14 is heated when forming the mechanical interlock. In this way, superalloy foil or powder 21 may act as a physical barrier that prevents metallurgic bonding of braze material 14 to joint surfaces 18a and 18b.

In some examples, as shown in FIG. 9A, superalloy foil or powder 21 may at least partially surround braze material 14. For example, a superalloy foil may be wrapped around a circumference of braze material 14 or a powder may be disposed (e.g., rolled, sprayed, or dusted) on circumferential surfaces of braze material 14, as shown in FIG. 9A. In other examples, superalloy foil or powder 21 may be disposed against joint surfaces 18a and 18b.

Superalloy foil or braze 21 can be positioned between braze material 14 and joint surfaces 18a and 18b at any one or more of multiple times throughout the joining process of components 12a and 12b. Superalloy foil or braze 21 can be applied, for example, before coating joint surfaces 18a and 18b with an adhesion resistant coating (30), after coating joint surfaces 18a and 18b with an adhesion resistant coating (30), before positioning first and second components 12a and 12b adjacent to each other (32), after positioning first and second components 12a and 12b adjacent to each other (32), before positioning braze material 14 in the joint region (36), or after before positioning braze material 14 in the joint region (36) in the technique of FIG. 2.

In some examples, superalloy foil or powder 21 includes a lower concentration of melting point depressants, such as silicon or boron, than braze material 14. As such, during heating of braze material 14 to form the mechanical interlock, at least some of the melting point depressants, such as silicon or boron, may diffuse into the superalloy foil or powder 21, reducing the concentration of these species in braze material 14. This may raise a melting temperature of braze material 14, improving mechanical properties of the mechanical interlock.

Figure 9B:
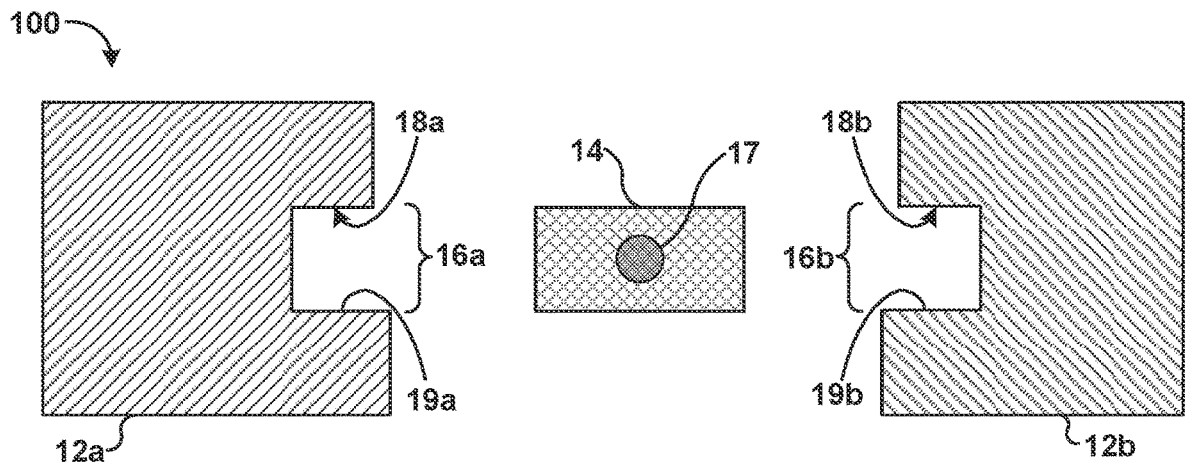
FIG. 9B is a conceptual and schematic diagram illustrating a partial sectional and exploded view of a region similar to region A of the system of FIG. 1B.

In some examples, an assembly may include a melting point depressant sink in addition to, or instead of, superalloy foil or powder 21. FIG. 9B is a conceptual and schematic diagram illustrating a partial sectional and exploded view of a region similar to region A of the system of FIG. 1B.

Assembly 100 of FIG. 9B is similar to assembly 10 of FIGS. 1A-1C except for the differences described herein. For example, like assembly 10, assembly 90 incudes first and second components 12a and 12b. First component 12a defines joining region 16a and joint surface 18a. Second component 12b defines joining region 16b and joint surface 18b. Joint surfaces 18a and 18b include adhesion resistant coatings 19a and 19b. Assembly 90 also includes braze material 14, which may include any of the braze materials described herein.

Unlike assembly 10, assembly 100 includes a wire 17 embedded in braze material 14. Wire 17 may include any suitable superalloy, such as a Ni- or Co-based superalloy. For example, wire 17 may include Ni-based alloys available from Martin-Marietta Corp., Bethesda, MD, under the trade designation MAR-M246, MAR-M247; Ni-based alloys available from Cannon-Muskegon Corp., Muskegon, MI, under the trade designations CMSX-3, CMSX-4, CMSX-10, and CM-186; Co-based alloys available from Martin-Marietta Corp., Bethesda, MD, under the trade designation MAR-M509; or the like. The superalloy of wire 17 may be selected to have a melting temperature that is greater than the processing temperature to which braze material 14 is heated when forming the mechanical interlock.

Wire 17, as shown in FIG. 9B, has a circular transverse cross-section. However, wire 17 can take any suitable configuration, such as rectangular cross-section (aligned vertically, horizontally, or other to braze material 14), an elliptical cross-section, or the like. Wire 17 can also extend along a length of braze material 14 continuously or intermittently (e.g., at regularly- or irregularly-spaced sections). Further, although assembly 100 includes a single wire 17, an assembly 100 may include multiple wires contacting or embedded within braze material 14.

Wire 17 may include a lower concentration of melting point depressants, such as silicon or boron, than braze material 14. As such, during heating of braze material 14 to form the mechanical interlock, at least some of the melting point depressants, such as silicon or boron, may diffuse into the wire 17, reducing the concentration of these species in braze material 14. This may raise a re-melting temperature of braze material 14, improving mechanical properties of the mechanical interlock ultimately formed from braze material 14.

Various examples have been described. These and other examples are within the scope of the following claims.

What is claimed is:

1. An assembly comprising:
   a first component;
   a second component, wherein the first component and second component are positioned adjacent to each other to define a joint region between adjacent portions of the first component and the second component, wherein the joint region defines a joint surface;
   a mechanical interlock comprising braze material disposed in the joint region, wherein the braze material includes a low-melt powder and a high-melt powder; and
   an adhesion resistant material between the braze material and the joint surface, wherein the adhesion resistant material is configured to resist adherence of the braze material to the joint surface, wherein the braze material is configured to form an at least softened material in the joint region in response to heating the braze material to at least a processing temperature, and wherein the at least softened material is configured to form the mechanical interlock in the joint region mechanically joining the first and second components in response to cooling, and wherein the braze material is not metallurgically bonded to the first component or the second component.

2. The assembly of claim 1, further comprising a heat source configured to heat the braze material in the joint region.

3. The assembly of claim 1, wherein the adhesion resistant material comprises an adhesion resistant coating on the joint surface, and wherein the adhesion resistant coating comprises at least one of an oxidation resistant coating or a corrosion resistant coating.

4. The assembly of claim 1, wherein the adhesion resistant material comprises at least one of a superalloy foil or a superalloy powder, and wherein the at least one of the superalloy foil or the superalloy powder is selected to have a melting point above the processing temperature.

5. The assembly of claim 1, wherein the mechanical interlock at least partially surrounds at least one of the first component or the second component to mechanically secure the first component relative to the second component.

6. The assembly of claim 1, wherein the first component and the second component define an opening in the joint region, wherein the opening is configured to allow introduction of the braze material into the joint region.

7. The assembly of claim 1, wherein the first component and the second component define a conical seal interface.

8. The assembly of claim 1, wherein the braze material comprises one or more of a putty, a paste, a sheet, a strip, a pre-molded shape at least partially conforming to the joint region, or a pre-sintered preform having a shape substantially conforming to the joint region.

9. The assembly of claim 8, wherein the first component comprises a Ni-based or a Co-based superalloy, and wherein the second component comprises a Ni-based or a Co-based superalloy.

10. An assembly comprising:
    a first component with a first joint surface;
    a second component with a second joint surface;
    a first adhesion resistant layer on the first joint surface, wherein the first adhesion layer comprises a first material selected to resist adherence of a braze material to the first joint surface;
    a second adhesion resistant layer on the second joint surface, wherein the second adhesion layer comprises a second material selected to resist adherence of a braze material to the second joint surface; and
    a mechanical interlock between the first adhesion resistant layer and the second adhesion resistant layer, wherein the mechanical interlock comprises the braze material metallurgically unbound to any of the first adhesion resistant layer, the second adhesion resistant layer, the first joint surface, and the second joint surface, and wherein the mechanical interlock at least partially surrounds at least one of the first component or the second component to mechanically secure the first component relative to the second component.

11. The assembly of claim 10, wherein first adhesion layer and the second adhesion layer each comprise at least one of a superalloy foil or a superalloy powder, and wherein the at least one of the superalloy foil or the superalloy powder is selected to have a melting point above a processing temperature of the braze material.

12. The assembly of claim 10, wherein the first component comprises a Ni-based or a Co-based superalloy, and wherein the second component comprises a Ni-based or a Co-based superalloy.

13. The assembly of claim 10, wherein the braze material comprises one or more of a putty, a paste, a sheet, a strip, a pre-molded shape at least partially conforming to a joint region between the first adhesion resistant layer and the second adhesion resistant layer, or a pre-sintered preform having a shape substantially conforming to the joint region.

14. An assembly comprising:
- a first component with a first joint surface;
- a second component with a second joint surface;
- a first adhesion resistant layer on the first joint surface, wherein the first adhesion layer comprises a first material selected to resist adherence of a braze material to the first joint surface;
- a second adhesion resistant layer on the second joint surface, wherein the second adhesion layer comprises a second material selected to resist adherence of a braze material to the second joint surface; and
- a mechanical interlock between the first adhesion resistant layer and the second adhesion resistant layer, wherein the mechanical interlock is derived from a braze material that is heated to a processing temperature and softened, and subsequently cooled, wherein the braze material is metallurgically unbound to any of the first adhesion resistant layer, the second adhesion resistant layer, the first joint surface, and the second joint surface, and wherein the mechanical interlock at least partially surrounds at least one of the first component or the second component to mechanically secure the first component relative to the second component.

15. The assembly of claim 14, wherein first adhesion layer and the second adhesion layer each comprise at least one of a superalloy foil or a superalloy powder, and wherein the at least one of the superalloy foil or the superalloy powder is selected to have a melting point above a processing temperature of the braze material.

16. The assembly of claim 14, wherein the first component comprises a Ni-based or a Co-based superalloy, and wherein the second component comprises a Ni-based or a Co-based superalloy.

17. The assembly of claim 14, wherein the braze material comprises one or more of a putty, a paste, a sheet, a strip, a pre-molded shape at least partially conforming to a joint region between the first adhesion resistant layer and the second adhesion resistant layer, or a pre-sintered preform having a shape substantially conforming to the joint region.

* * * * *